United States Patent
West et al.

(10) Patent No.: US 8,386,101 B2
(45) Date of Patent: Feb. 26, 2013

(54) DETECTING PROGRAM FLOW FAULT IN TORQUE SECURITY SOFTWARE FOR HYBRID VEHICLE ELECTRIC DRIVE SYSTEM

(75) Inventors: Stephen T. West, New Palestine, IN (US); Wei D. Wang, Troy, MI (US); Hanne Buur, Brighton, MI (US)

(73) Assignee: GM Global Technology Operations LLC

( * ) Notice: Subject to any disclaimer, the term of this patent is extended or adjusted under 35 U.S.C. 154(b) by 992 days.

(21) Appl. No.: 12/240,145

(22) Filed: Sep. 29, 2008

(65) Prior Publication Data
US 2009/0118881 A1 May 7, 2009

Related U.S. Application Data

(60) Provisional application No. 60/986,108, filed on Nov. 7, 2007.

(51) Int. Cl.
*B60W 20/00* (2006.01)
(52) U.S. Cl. .......................................... 701/22
(58) Field of Classification Search .................. 701/22, 701/102, 1, 33.7, 34.3; 903/903, 902; 290/40 C; 180/165, 65.1, 65.235, 65.23, 65.24; 477/3; 708/250
See application file for complete search history.

(56) References Cited

U.S. PATENT DOCUMENTS

| | | | | |
|---|---|---|---|---|
| 5,436,837 A * | 7/1995 | Gerstung et al. | ............. | 701/29.2 |
| 6,018,694 A * | 1/2000 | Egami et al. | .................. | 701/102 |
| 6,067,586 A * | 5/2000 | Ziegler et al. | ................... | 710/18 |
| 6,088,639 A * | 7/2000 | Fayyad et al. | ................... | 701/45 |
| 6,490,511 B1 * | 12/2002 | Raftari et al. | ................... | 701/22 |
| 6,952,795 B2 * | 10/2005 | O'Gorman et al. | ............ | 714/33 |
| 7,143,314 B2 * | 11/2006 | Costin | ........................ | 714/38.13 |
| 2006/0036911 A1 * | 2/2006 | Costin et al. | ..................... | 714/25 |
| 2006/0074500 A1 * | 4/2006 | Naik et al. | ...................... | 700/21 |
| 2007/0016340 A1 * | 1/2007 | Soudier et al. | .................... | 701/1 |
| 2008/0028012 A1 * | 1/2008 | Kato et al. | ..................... | 708/250 |
| 2008/0059016 A1 * | 3/2008 | Mayhew et al. | ................ | 701/30 |
| 2008/0177453 A1 * | 7/2008 | Costin et al. | .................... | 701/60 |
| 2008/0224478 A1 * | 9/2008 | Tamor | ......................... | 290/40 C |
| 2011/0010032 A1 * | 1/2011 | Kozarekar et al. | ............. | 701/22 |

FOREIGN PATENT DOCUMENTS
JP 2007166821 A * 6/2007

* cited by examiner

*Primary Examiner* — James P Trammell
*Assistant Examiner* — David Testardi

(57) ABSTRACT

A diagnostic system for a hybrid vehicle comprises a processor module and a motor control module. The processor module outputs a seed value. The motor control module controls torque output by an electric motor of the hybrid vehicle, receives the seed value, generates a final key value based on the seed value, and outputs the final key value to the processor module.

16 Claims, 3 Drawing Sheets

DETECTING PROGRAM FLOW FAULT IN TORQUE SECURITY SOFTWARE FOR HYBRID VEHICLE ELECTRIC DRIVE SYSTEM

CROSS-REFERENCE TO RELATED APPLICATIONS

This application claims the benefit of U.S. Provisional Application No. 60/986,108, filed on Nov. 8, 2007. The disclosure of the above application is incorporated herein by reference in its entirety.

FIELD

The present disclosure relates to hybrid vehicles, and more particularly to processor security diagnostics for hybrid vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, an electric hybrid vehicle 10 according to the prior art is shown. The electric hybrid vehicle 10 includes an engine assembly 12, a hybrid power assembly 14, a transmission 16, a drive axle 18, and a control module 20. The engine assembly 12 includes an internal combustion engine 22 that is in communication with an intake system 24, a fuel system 26, and an ignition system 28.

The intake system 24 includes an intake manifold 30, a throttle 32, and an electronic throttle control (ETC) 34. The ETC 34 controls the throttle 32 to control airflow into the engine 22. The fuel system 26 includes fuel injectors (not shown) to control a fuel flow into the engine 22. The ignition system 28 ignites an air/fuel mixture provided to the engine 22 by the intake system 24 and the fuel system 26.

The engine 22 is coupled to the transmission 16 via a coupling device 44. The coupling device 44 may include one or more clutches and/or a torque converter. The engine 22 generates torque to drive the transmission 16 and propel the electric hybrid vehicle 10. The transmission 16 transfers power from the engine 22 to an output shaft 46, which rotatably drives the drive axle 18.

The hybrid power assembly 14 includes one or more motor generator units. For example only, as shown in FIG. 1, the hybrid power assembly 14 includes two motor generator units: a first motor generator unit (MGU) 38 and a second MGU 40. The hybrid power assembly 14 also includes a power control device 41 and a rechargeable battery 42.

The first and second MGUs 38 and 40 operate independently and at any given time may each operate as either a motor or a generator. An MGU operating as a motor supplies power (e.g., torque), all or a portion of which may be used to drive the output shaft 46. An MGU operating as a generator converts mechanical power into electrical power.

For example only, the first MGU 38 may generate electrical power based on the output of the engine 22, and the second MGU 40 may generate electrical power based on the output shaft 46. Electrical power generated by one of the MGUs 38 and 40 may be used, for example, to power the other of the MGUs 38 and 40, to recharge the battery 42, and/or to power electrical components. While the MGUs 38 and 40 are shown as being located within the transmission 16, the MGUs 38 and 40 may be located in any suitable location.

The control module 20 is in communication with the fuel system 26, the ignition system 28, the ETC 34, the MGUs 38 and 40, the power control device 41, and the battery 42. The control module 20 is also in communication with an engine speed sensor 48 that measures an engine speed. For example, the engine speed may be based on the rotation of the crankshaft. The engine speed sensor 48 may be located within the engine 22 or at any suitable location, such as near the crankshaft.

The control module 20 controls operation of the engine 22 and the MGUs 38 and 40. The control module 20 also selectively controls recharging of the battery 42. The control module 20 controls recharging of the battery 42 and the operation of the MGUs 38 and 40 via the power control device 41. The power control device 41 controls power flow between the battery 42 and the MGUs 38 and 40. For example only, the power control device 41 may be an inverter and/or an IGBT (insulated gate bipolar transistor).

The control module 20 may include multiple processors for controlling respective operations of the electric hybrid vehicle 10. For example, the control module 20 may include a first processor for determining desired torque for the engine 22 and the MGUs 38 and 40 and a second processor for controlling torque of each of the MGUs 38 and 40.

SUMMARY

A diagnostic system for a hybrid vehicle comprises a processor module and a motor control module. The processor module outputs a seed value. The motor control module controls torque output by an electric motor of the hybrid vehicle, receives the seed value, generates a final key value based on the seed value, and outputs the final key value to the processor module.

In other features, the processor module selectively diagnoses a fault in the motor control module.

In further features, the processor module selectively diagnoses the fault based on the final key value.

In still further features, the processor module selectively diagnoses the fault based on a comparison of the final key value with an expected value.

In other features, the processor module diagnoses the fault when the final key value is one of greater than and less than the expected value.

In further features, the motor control module performs a number of computations, determines the final key value based on the computations, and outputs the number of computations performed to the processor module.

In still further features, the processor module selectively diagnoses the fault based on the number of computations performed.

In other features, the processor module diagnoses the fault when the number of computations performed is one of greater than and less than a predetermined number of computations.

In still other features, each of the number of computations comprises determining a partial key value based on at least one of a lookup table and a logical computation.

In further features, a first computation of the number of computations is based on the seed value.

A method for a hybrid vehicle comprises: transmitting a seed value from a first module to a second module that controls torque output by an electric motor of the hybrid vehicle; generating a final key value based on the seed value using the second module; and transmitting the final key value from the second module to the first module.

In other features, the method further comprises selectively diagnosing a fault in the second module.

In still other features, the selectively diagnosing the fault comprises selectively diagnosing the fault based on the final key value.

In further features, the selectively diagnosing the fault comprises selectively diagnosing the fault based on a comparison of the final key value with an expected value.

In still further features, the selectively diagnoses the fault comprises diagnosing the fault when the final key value is one of greater than and less than the expected value.

In other features, the method further comprises performing a number of computations using the second module and outputting the number of computations performed to the first module, wherein the determining the final key value comprises determining the final key value based on the number of computations.

In further features, the selectively diagnosing the fault comprises selectively diagnosing the fault based on the number of computations performed.

In still further features, the selectively diagnosing the fault comprises diagnosing the fault when the number of computations performed is one of greater than and less than a predetermined number of computations.

In other features, each of the number of computations comprises determining a partial key value based on at least one of a lookup table and a logical computation.

In still other features, a first computation of the number of computations is performed based on the seed value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
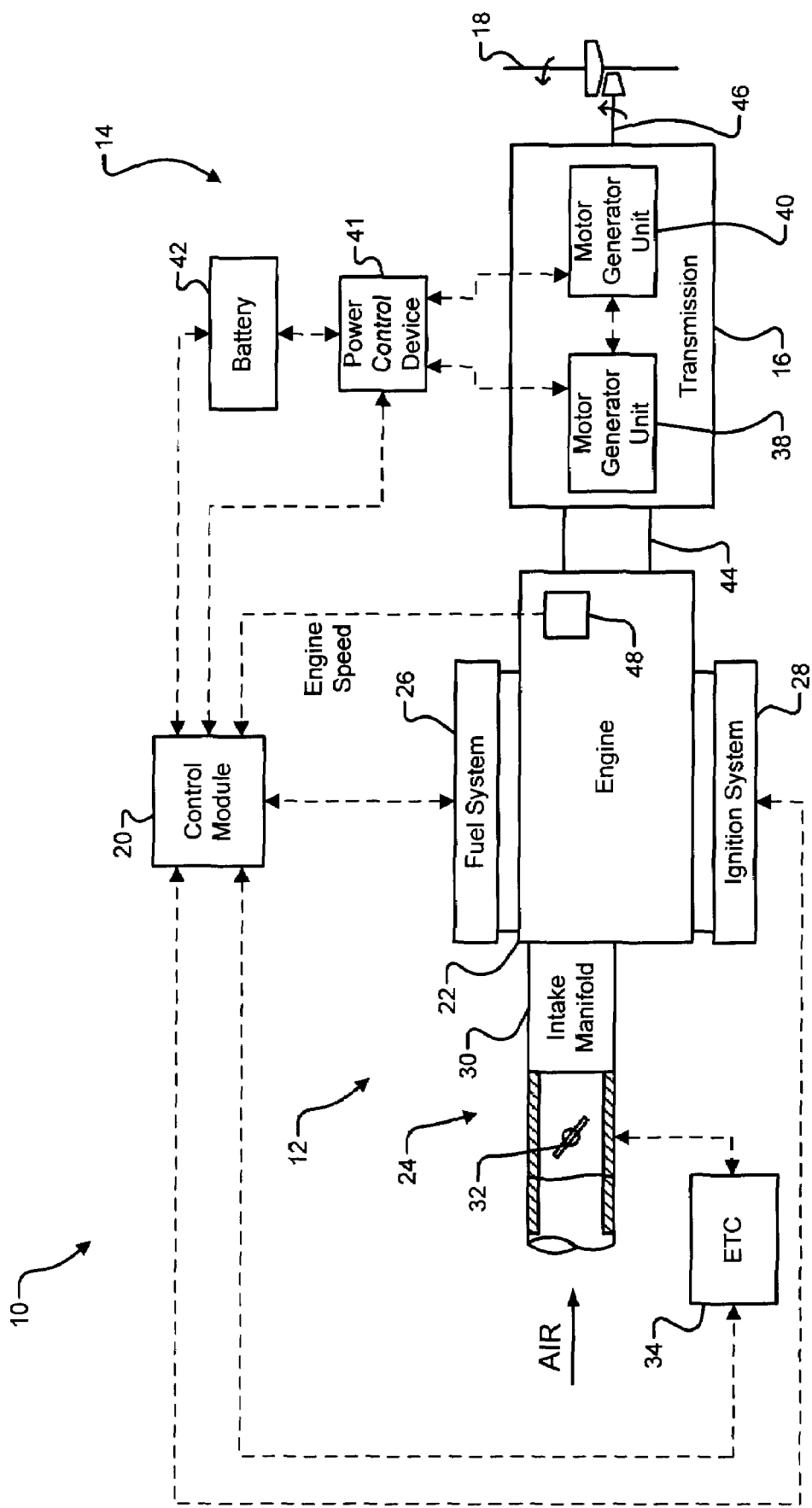
FIG. 1 is a functional block diagram of an electric hybrid vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
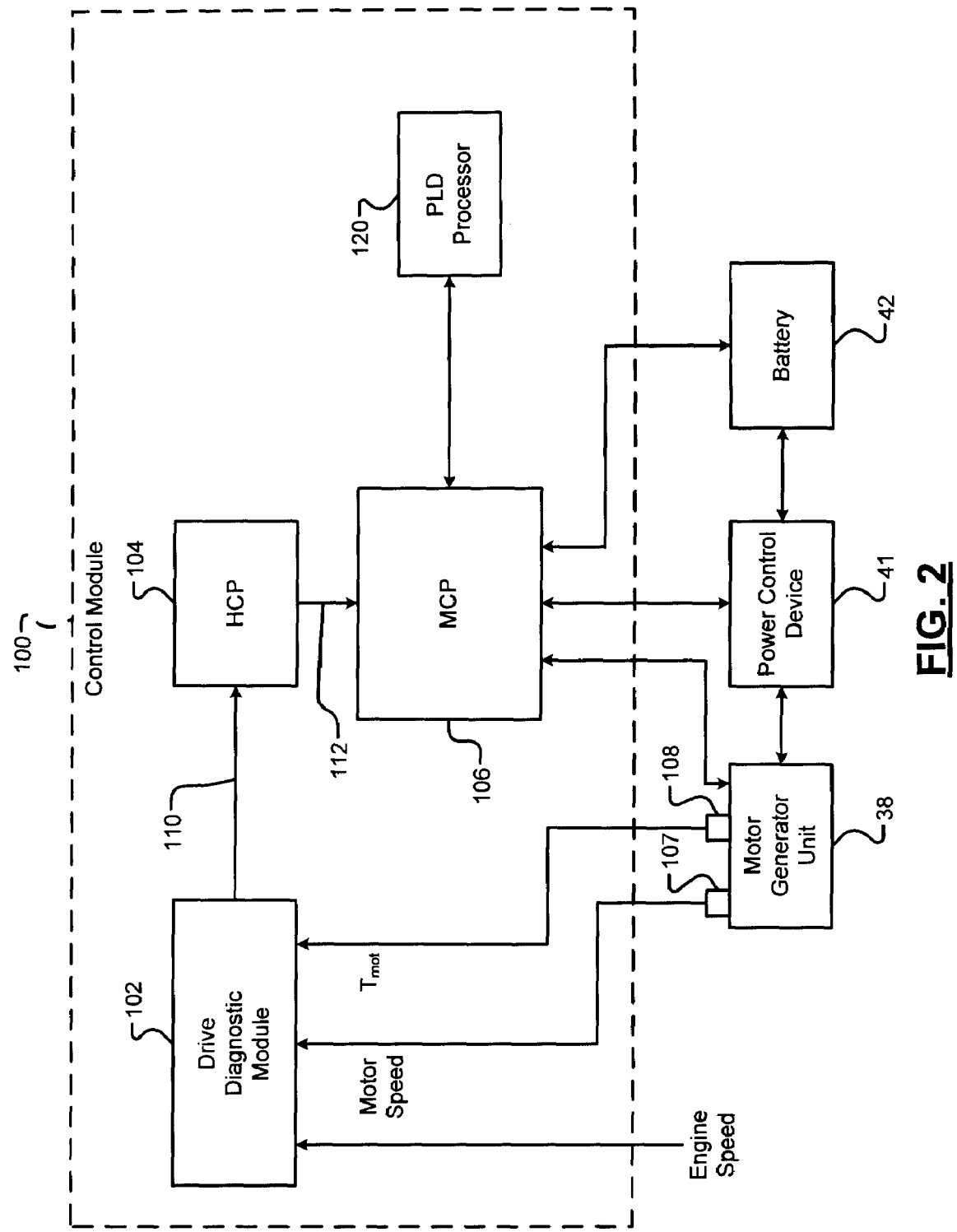
FIG. 2 is a functional block diagram of an exemplary control module that includes a hybrid control processor and a motor control processor according to the present disclosure.

Referring now to FIG. 2, a functional block diagram of an exemplary control module 100 of an electric hybrid vehicle according to the present disclosure is presented. The control module 100 includes a drive diagnostic module 102, a hybrid control processor (HCP) 104, and a motor control processor (MCP) 106. The drive diagnostic module 102 receives various inputs including, but not limited to, engine speed, motor speed, and motor torque.

For example, the drive diagnostic module 102 receives the engine speed from the engine speed sensor 48. The drive diagnostic module 102 also receives a motor speed measured by a motor speed sensor 107 and a motor torque ($T_{mot}$) measured by a motor torque sensor 108. The motor speed sensor 107 and the motor torque sensor 108 measure the speed and torque of the first MGU 38, respectively. As the electric hybrid vehicle 10 includes more than one MGU, the drive diagnostic module 102 may receive the motor speed and torque of more than one MGU. For example, the drive diagnostic module 102 may also receive the motor speed and torque of the second MGU 40.

The drive diagnostic module 102 generates various signals 110 based on the engine speed, the motor speed, and the motor torque. The HCP 104 receives the signals 110 from the drive diagnostic module 102. The HCP 104 determines a requested motor torque 112 for an MGU based on the received signals 110. While the HCP 104 is shown as determining the requested motor torque 112 for the first MGU 38, the HCP 104 may determine a requested motor torque for each of the MGUs 38 and 40.

The MCP 106 receives the requested motor torque 112 from the HCP 104 and controls the torque of the first MGU 38 based on the requested motor torque 112. For example, the MCP 106 may cause power to be supplied to the first MGU 38 in an amount that allows the first MGU 38 to produce the requested motor torque 112. In other words, the MCP 106 controls the torque of the first MGU 38 based on the requested motor torque 112. As such, it is desirable to ensure that the torque commanded by the MCP 106 accurately corresponds to the requested motor torque 112.

The electric hybrid vehicle includes more than one MGU. Accordingly, the control module 100 may include more than one of the submodules. For example, the control module 100 may include a second MCP (not shown) that controls torque of the second MGU 40. While the principles of the present application will be discussed as they relate to the MCP 106 and the first MGU 38, the principles of the present application are also applicable to any suitable MCP and MGU.

The control module 100 may include multiple layers of security/diagnostics to ensure accuracy and consistency between the HCP 104 and the MCP 106. For example, one layer of diagnostics may relate to diagnostics of basic components and subsystems such as voltage and current sensors, temperature sensors, and resolver performance diagnostics. Another layer of diagnostics may relate to an independent calculation of achieved motor torque. This independent calculation of the achieved motor torque may be implemented using separate memory locations for software, calibration variables, and static variables. Values used in the calculation may be verified (e.g., using checksum verification) between different execution loops.

Yet another layer of diagnostics may be implemented to prevent software execution and/or processor faults of the MCP 106. For example only, the control module 100 may include a processor such as a Programming Logic Device (PLD) processor 120. While the PLD processor 120 is shown as being located external to the MCP 106, the PLD processor 120 may be located in any suitable location.

The PLD processor 120 may be used to verify the MCP 106. Likewise, the MCP 106 may be used to verify the PLD processor 120. The PLD processor 120 and/or the MCP 106 may be verified via an information exchange. For example, the PLD processor 120 according to the present implementation sends a seed value to the MCP 106. The MCP 106 determines a return key value based on the seed value and transmits the return key to the PLD processor 120.

The PLD processor 120 determines the functionality of the MCP 106 based on the return key (e.g., by comparing the return key to an expected key). The PLD processor 120 may also determine the functionality of the MCP 106 based on how the MCP 106 arrived at the return key. If the return key does not match the expected key or if the MCP 106 arrived at the return key incorrectly, the PLD processor 120 may implement remedial actions. For example only, the PLD processor 120 may reset the MCP 106 and/or put the first MGU 38 into a secure shutdown mode.

Figure 3:
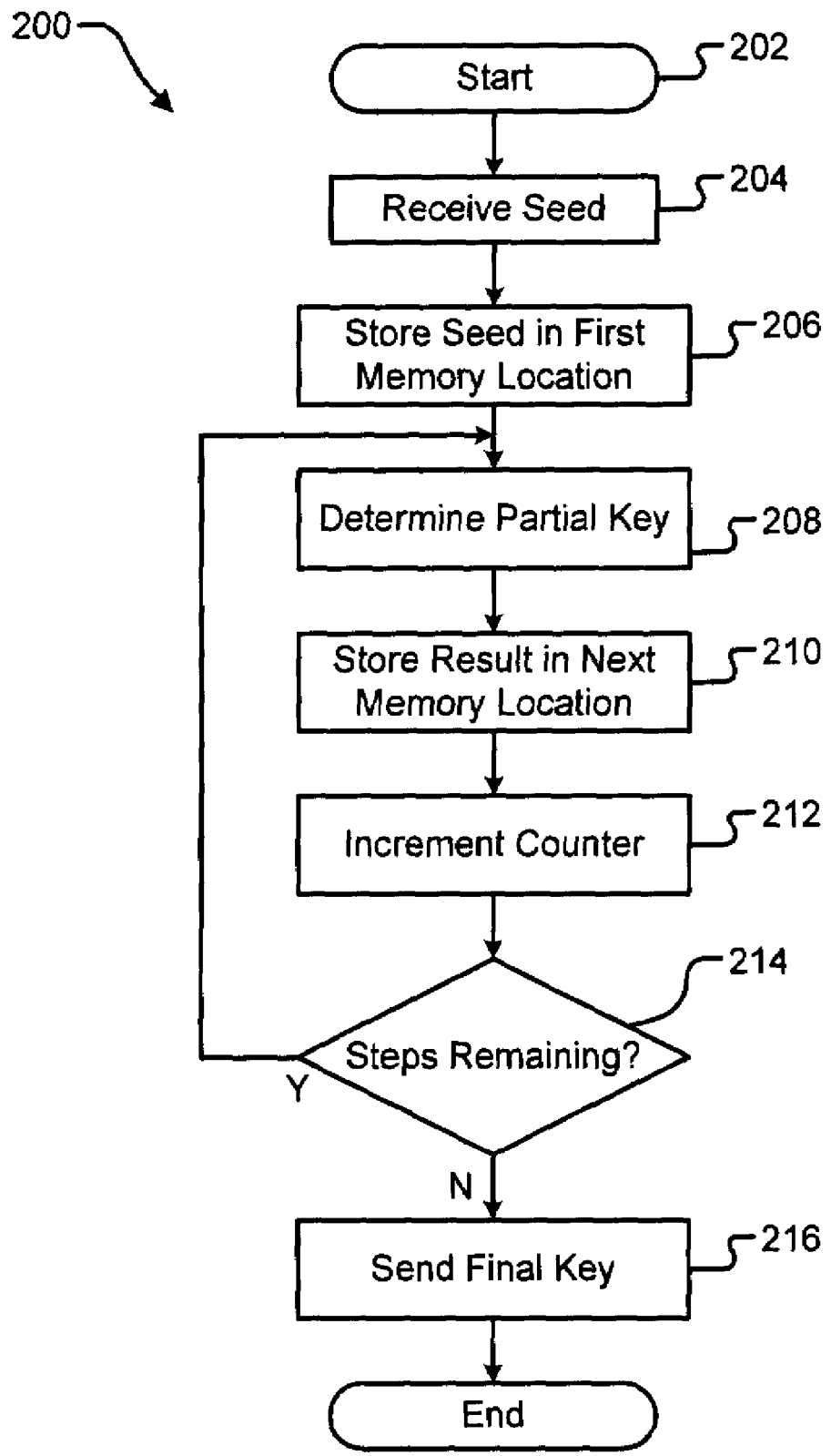
FIG. 3 is an exemplary flow diagram illustrating steps of generating a diagnostic return key according to the present disclosure.

Referring now to FIG. 3, a method 200 of generating the return key at the MCP 106 based on the seed value begins in step 202. The method 200 may implement a predetermined number (e.g., N number) of successive computational steps (e.g., table lookups and/or logical computations) to determine a final key. Each successive computational step results in a new partial key value until the method 200 determines the final key. Each of the computational steps may also involve one subroutine function call and calculation and storage of a partial key.

The method 200 receives the seed value in step 204. The PLD processor 120 may provide the seed value periodically or in response to certain conditions. In step 206, the seed value is stored in a memory location, such as a first fixed location of an array. The method 200 may also move a pointer to a next fixed location of the array in step 206. The method 200 determines a partial key based on the stored value in step 208. For example only, the method 200 may determine the partial key based on a lookup table and/or a logical computation. The method 200 may also determine the partial key based on a previous partial key.

The method 200 stores the result (i.e., the partial key) in the previously identified, next fixed location of the array in step 210. The method 200 increments a counter value in step 212. In this manner, the counter value indicates the number of computational steps performed.

The method 200 determines whether any steps remain to be performed in step 214. If false, the method 200 continues to step 216. If true, the method 200 repeats steps 208 through 214. For example, steps may remain when the counter value is less than the predetermined number of steps. In other words, the method 200 continues to perform the computational steps, determine partial keys, and store the results in the corresponding next locations of the array until the predetermined number of steps have been performed. Once the predetermined number of steps have been performed, the final key is determined.

The final key is returned to the PLD processor 120 in step 216. The final key may be, for example, the last stored partial key or a combination of one or more of the stored partial keys. The final key indicates the accuracy of the MCP 106. The counter value may also be an indicator of the accuracy of the MCP 106. For example, if any of the function call computations are not performed or are performed in the incorrect order, the final key will be incorrect. Further, the counter value may be incorrect if an incorrect number of computational steps were performed in arriving at the final key.

A processor fault (i.e., a fault in the MCP 106) has likely occurred when the counter value does not match the expected number of steps. For example, when a particular computational step is performed twice, the counter value (i.e., total number of function calls) will exceed the number of expected steps (i.e., the predetermined number of steps).

Conversely, if a particular computational step is performed twice while another is not performed, or if the computational steps are performed in an incorrect order, the expected number of steps will be performed. However, as the final key is arrived at incorrectly, the final key will be incorrect. The counter value may be reset after the PLD processor 120 receives the final key. In other implementations, the counter value may be reset before the first partial key is determined.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a hybrid vehicle, comprising:
a processor module that outputs a seed value; and
a motor control module that controls torque output by an electric motor of said hybrid vehicle, that receives said seed value, that performs a number of computational steps based on said seed value, that increments a counter value each time one of said computational steps is performed, that generates a final key value as a result of said computational steps, that outputs said final key value to said processor module, and that outputs said counter value to said processor module.

2. The diagnostic system of claim 1 wherein said processor module selectively diagnoses a fault in said motor control module.

3. The diagnostic system of claim 2 wherein said processor module selectively diagnoses said fault based on said final key value.

4. The diagnostic system of claim 3 wherein said processor module selectively diagnoses said fault based on a comparison of said final key value with an expected value.

5. The diagnostic system of claim 4 wherein said processor module diagnoses said fault when said final key value is one of greater than and less than said expected value.

6. The diagnostic system of claim 2 wherein said processor module selectively diagnoses said fault based on said counter value.

7. The diagnostic system of claim 6 wherein said processor module diagnoses said fault when said counter value is one of greater than and less than an expected number of computational steps.

8. The diagnostic system of claim 2 wherein each of said computational steps comprises determining a partial key value based on at least one of a lookup table and a logical computation.

9. A method for a hybrid vehicle, comprising:
transmitting a seed value from a first module to a second module that controls torque output by an electric motor of said hybrid vehicle;
performing a number of computational steps based on said seed value;
incrementing a counter value each time one of said computational steps is performed;

generating a final key value as a result of said computational steps using said second module;

transmitting said final key value from said second module to said first module; and transmitting said counter value from said second module to said first module.

10. The method of claim 9 further comprising selectively diagnosing a fault in said second module.

11. The method of claim 10 wherein said selectively diagnosing said fault comprises selectively diagnosing said fault based on said final key value.

12. The method of claim 11 wherein said selectively diagnosing said fault comprises selectively diagnosing said fault based on a comparison of said final key value with an expected value.

13. The method of claim 12 wherein said selectively diagnoses said fault comprises diagnosing said fault when said final key value is one of greater than and less than said expected value.

14. The method of claim 10 wherein said selectively diagnosing said fault comprises selectively diagnosing said fault based on said counter value.

15. The method of claim 14 wherein said selectively diagnosing said fault comprises diagnosing said fault when said counter value is one of greater than and less than an expected number of computational steps.

16. The method of claim 10 wherein each of said computational steps comprises determining a partial key value based on at least one of a lookup table and a logical computation.

* * * * *